United States Patent [19]

Chen

[11] Patent Number: 4,974,352
[45] Date of Patent: Dec. 4, 1990

[54] PICTURE FRAME

[76] Inventor: Sung Shwu-Jen, No. 46, Lane 179, Sec. 3, Tung Men Rd., Tainan, Taiwan

[21] Appl. No.: 397,241

[22] Filed: Aug. 23, 1989

[51] Int. Cl.$^5$ .............................................. A47G 1/06
[52] U.S. Cl. ...................................... 40/152; 403/403
[58] Field of Search .......................... 40/152; 160/381; 403/295, 403

[56] References Cited

U.S. PATENT DOCUMENTS 3,294,429  12/1966  Halip .................................... 403/295
4,683,634   8/1987  Cole ................................ 403/295 X Primary Examiner—James R. Brittain
Assistant Examiner—Joanne Bonifanti
Attorney, Agent, or Firm—Thomas S. Keaty

[57] ABSTRACT

A picture frame including two side members, a top member, a bottom member and four connecting means. Each of the two side members, the top member and the bottom member has a flat elongated base. A first flange protrudes from the elongated base adjacent to a first edge of the base and extends along a length of the base. A second flange protrudes from a middle region of the base and extends along the length of the base. A third flange protrudes from a second edge of the base and extends along the length of the base. The first flange has two slots formed at a position adjacent to each end thereof. A fourth flange protrudes from a middle portion of the second flange. The first flange, the second flange, the fourth flange and the base together define a first channel therebetween within which the connecting means is slidable. The second flange and the third flange together define a second channel for receiving a picture or photograph. The connecting means is substantially L-shaped including two side portions. Each of the side portions of the connecting means has a slot within which a resilient engaging element is formed. Two studs are formed on each resilient engaging element for engaging with the slots in the frame members to connect the members together.

1 Claim, 5 Drawing Sheets 4,974,352

PICTURE FRAME

BACKGROUND OF THE INVENTION

The present invention relates to a picture frame, especially to an easy-to-assemble picture frame consisting of four separate members and four engaging members provided at four corners thereof.

Picture frames are a common household item. Generally, for practical use, conventional picture frames are provided with disassembly means. However, there are still disadvantages which exist within such picture frames. Referring to FIG. 6, wherein a conventional picture frame is shown, four engaging means 8 are provided on four corners of the frame 1 for connecting the four members 9 of the frame 1. Since screws 81 are screwed into the members 9 for fixing the connecting means 8 to the members 9, the surface of each member is injured. Furthermore, a fixing tool, such as a screw driver is needed causing inconvenience during assembly. Additionally, if a screw is lost, a gap appears at the area of intersection between two adjacent members while reassembling the frame. More over, it is inconvenient to install a photograph or a picture in the frame because the picture frame must first be disassembled and then the photograph or picture is put into a space between the glass and the back board. Then the picture frame must be reassembled.

The afore described problems experienced during use of the known picture frames are substantially avoided with the present picture frames.

SUMMARY OF THE INVENTION

It is an object of the present invention to provide a picture frame for which no tool is needed during assembly or disassembly.

It is another object of the present invention to provide a picture frame such that the members of the picture frame are not damaged during assembly.

It is still another object of the present invention to provide a picture frame wherein the members of the picture frame are not detached while installing or changing a photograph or picture.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENTS

Figure 4:
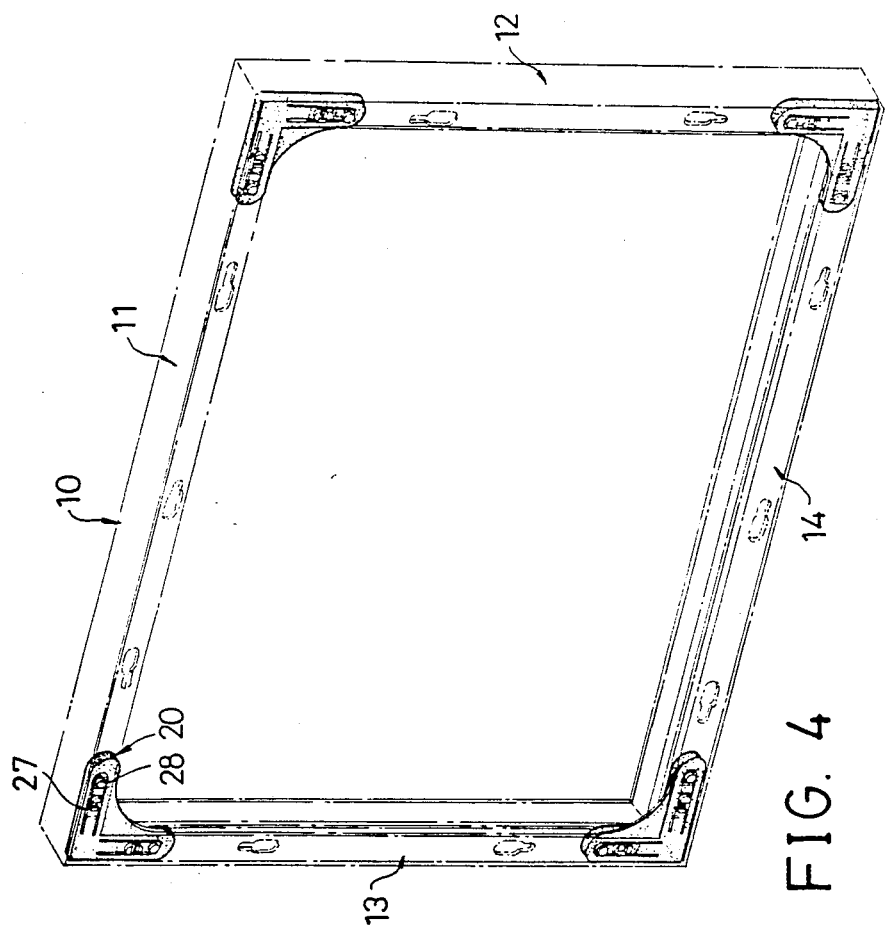
FIG. 4 is a perspective view of the picture frame, seen from the rear side, after assembly, in accordance with the present invention.

Referring now in detail to the drawings, and initially to FIG. 4, a picture frame 10 according to the present invention comprises two side members 12 and 13, a top member 11, a bottom member 14 and four connecting means 20.

Figure 3:
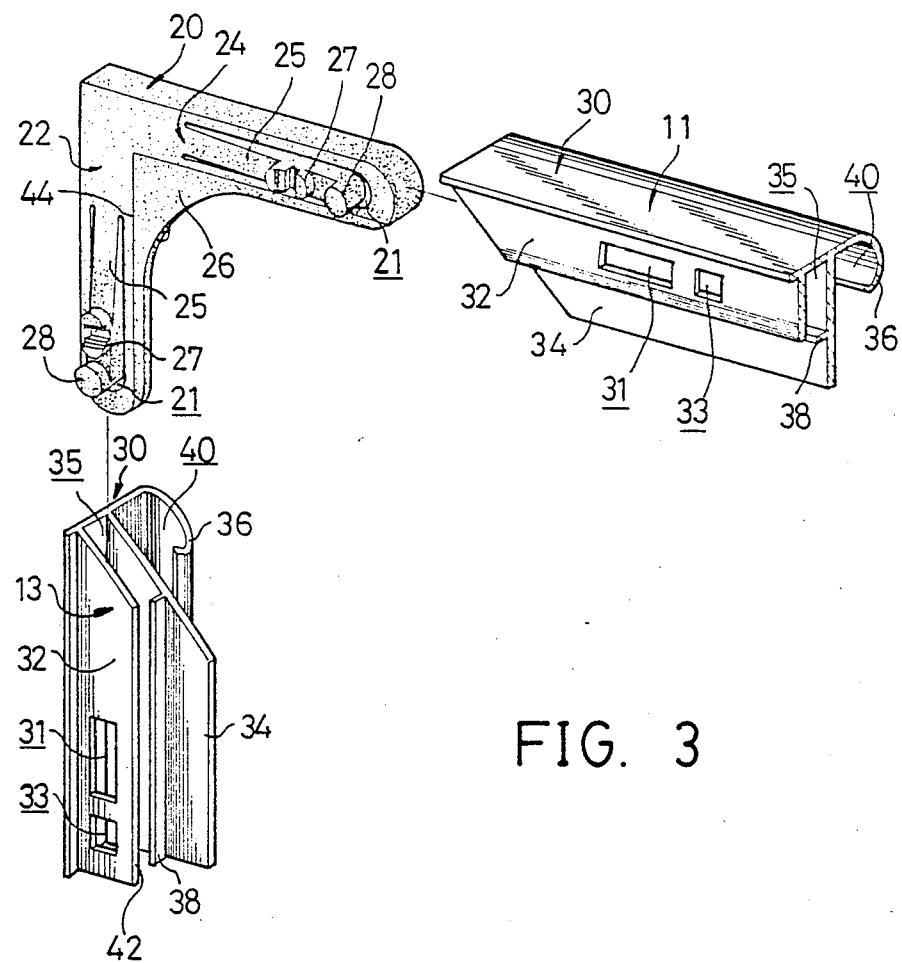
FIG. 3 is a schematic exploded perspective view of a top member, a side member and the connecting means which shows the connection of the top member and the side member by means of the connecting means.

As shown in FIG. 3, each of the side members 12 and 13, the top member 11 and the bottom member 14 has a flat elongated base 30. A first flange 32 protrudes from the elongated base 30 adjacent to a first edge thereof and extends along a length of the base 30. A second flange 34 protrudes from a middle region of the base 30 and extends along the length of the base 30. A third flange 36 protrudes from a second edge of the base 30 and extends along the length of the base 30. The first flange 32 has a first slot 31 and a second slot 33 formed thereon adjacent to each mitered end thereof. A fourth flange 38 protrudes from a middle portion of the second flange 34. The first flange 32, the second flange 34, the fourth flange 38 and the base 30 together define a first channel 35 therebetween within which the connecting means 20 is slidable. The second flange 34 and the third flange 36 together define a second channel 40 therebetween for receiving a picture or photograph. Each of the side members 12 and 13, the top member 11 and the bottom member 14 has two mitered ends, as shown in FIG. 3. The members of the picture frame, according to the present invention, are preferably formed by extrusion of aluminum.

Figure 1:
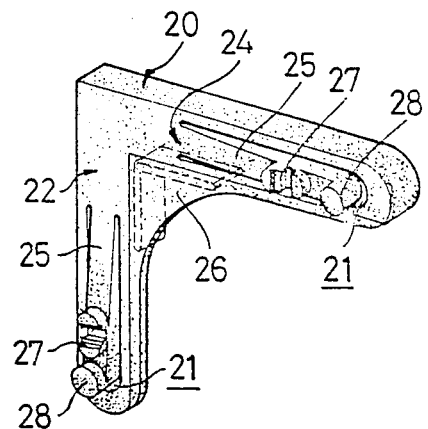
FIG. 1 is a perspective view of a connecting means, seen from the front side, in accordance with the present invention.
Figure 2:
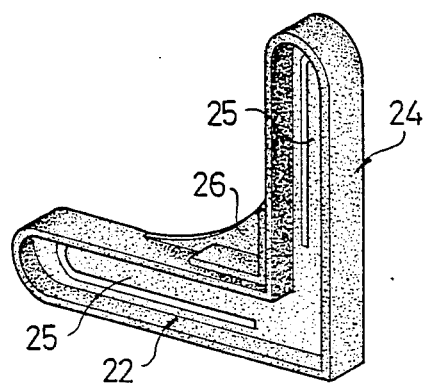
FIG. 2 is a perspective view of the connecting means of FIG. 1 as seen from the rear side.

Further to the description of the connecting means of the present invention, the connecting means 20, as shown in FIGS. 1 to 3, is substantially L-shaped and comprises two side portions, 22 and 24, and a corner portion 26. Each of the side portions, 22 and 24, of the connecting means 20 has a resilient engaging element 25 formed within a slot 21 thereof. Each resilient engaging element 25 has a first stud 27 and a second stud 28 formed thereon at a level above both the surface of the engaging element 25 and the side portions 22 and 24. The first stud 27 and the second stud 28 respectively engages with the first slot 31 and the second slot 33 during assembly. The corner portion 26 is provided in order to reinforce the structure of the connecting means 20.

The dimension and the shape of both the first channel 35 and the connecting means 20 are formed such that each side portion of the connecting means 20 is slidable therein along the length of the first channel 35 until the first and the second studs, 27 and 28, of the resilient engaging element 25 respectively engage with the first and the second slots 31 and 33. Additionally, in this particular embodiment, the corner portion 26 of the connecting means 20 is formed such that a bottom surface 44, of the corner portion 26, is positioned right above an upper edge 42 of the first flange 32 for enhancing the stability during engaging (see FIGS. 3 and 4).

Please refer to FIG. 3. During assembly of the picture frame of the present invention, a side portion of the connecting means 20 is insertable into the first channel 35 of a frame member. The following is a descriptive example illustrating the engagement of the side portion 22 of the connecting means 20 with the first channel 35 of the side member 13. Firstly the first stud 27 of the resilient engaging element 25 is depressed and then, the side portion 24 of the connecting means 20 is inserted into the first channel 35, of the side member 13, from one end thereof. The connecting means 20 is slidable along the length of the first channel 35 until both the first stud 27 and the second stud 28 respectively engages with the first slot 31 and the second slot 33. When the resilient engaging element 25 passes under the first and the second slots 31 and 33 provided on the first flange and both the first stud 27 and the second stud 28 are no longer constrained to a depressed position by the inner wall of the first flange 32. The resilient engaging element 25 moves upward to its original shape causing the first stud 27 and the second stud 28 respectively engage with the first slot and second slots 31 and 33. Similarly, the other side portion 22 of the connecting means 20 engages with the top member 11. In this way, the picture frame 10 of the present invention is assembled easily and without the use of any tools into a configuration as shown in FIG. 4.

Figure 5:
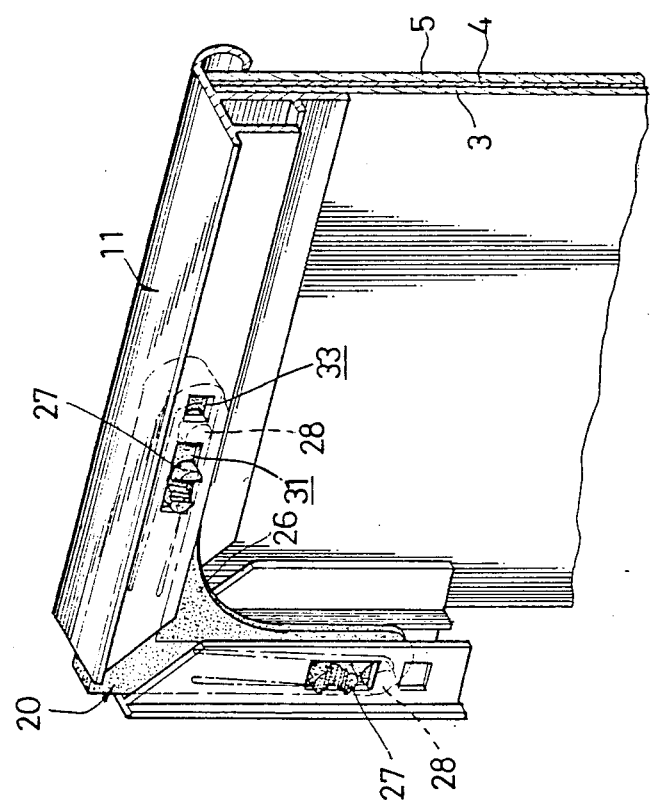
FIG. 5 is a partial perspective view of the picture frame showing the installing of a photograph or a picture, wherein the top member is sectioned.
Figure 6:
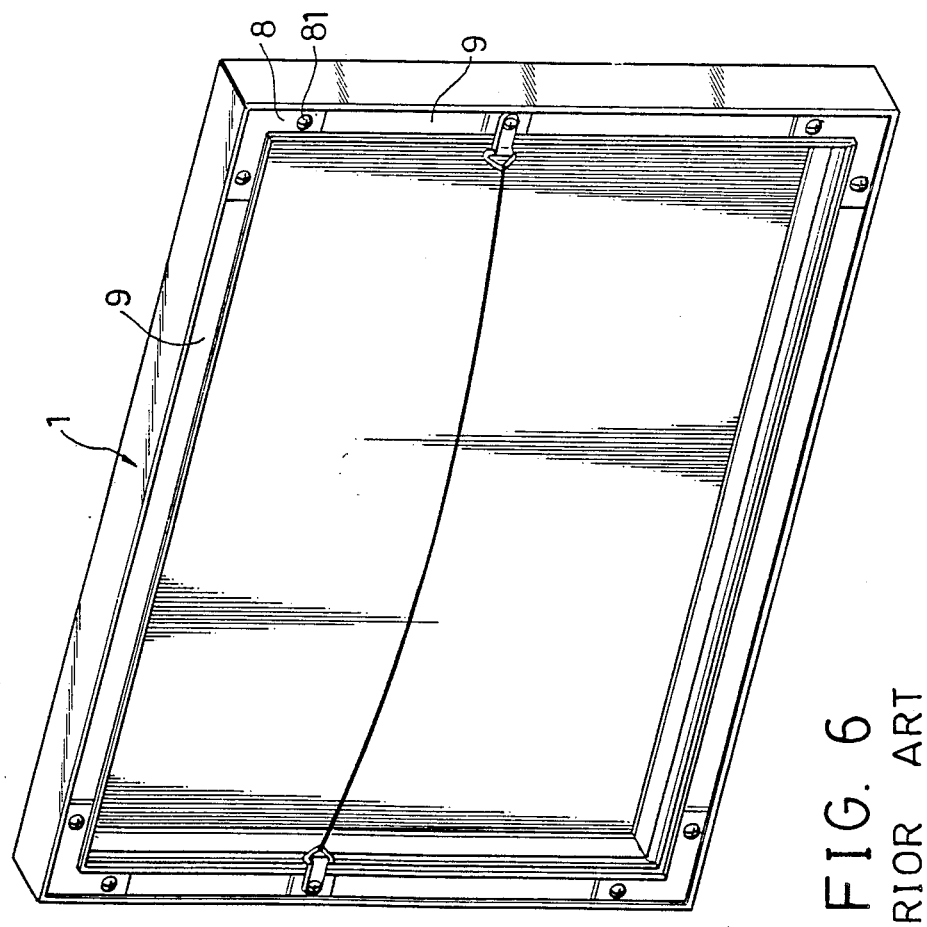
FIG. 6 is a rear perspective view of a prior picture frame.

Please refer to FIG. 5. When installing a back board and a glass plate as well as photograph or picture into the frame of the present invention, it is unnecessary to detach all the members of the present invention because the picture frame can be enlarged to allow insertion of the photograph or picture, etc. Depressing the first stud 27 of the resilient engaging element 25, thereby effecting the depression of the second stud 28, then pulling the connecting means 20 along the length of the first channel 35 still leaves the stud 27 partially depressed. As shown in FIG. 5, the first stud 27 is impeded by an edge of the first slot 31 while the second stud 28 remains constrained in a depressed position by an inner wall of the first flange at an region between the first slot 31 and the second slot 33, as clearly shown in FIG. 5. Thus, the length and width of the picture frame 10 of the present invention are enlarged thereby allowing a user to put a back plate 3, a picture 4 (or a photograph) and a glass plate 5 into the center of the frame 10. The picture frame 10 is reassembled by pushing the connecting means 20 at the four corners back to the engaged position. The edges of the back plate 3, the picture 4 (or the photograph) and the glass plate 5 are accordingly received within the second channel 40 defined by the second flange 34 and the third flange 36. Similarly, the aim of changing a photograph or a picture is easily achieved by repeating the afore mentioned steps.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A picture frame comprising two side members, a top member, a bottom member and four connecting means, each said side member, said top member and said bottom member having a flat elongated base, a first flange protruding from said base adjacent to a first edge thereof and extending along a length of said base, second flange protruding from a middle region of said base and extending along the length of said base, a third flange protruding from a second edge of said base and extending along the length of said base; said first flange having a first slot and a laterally spaced immediately adjacent second slot formed therethrough adjacent to each end thereof, thereby defining openings in said first flange a fourth flange protruding from a middle portion of said second flange; said first flange, said second flange and said fourth flange together defining a first channel therebetween within which said connecting means is slidable, said second flange and said third flange defining a second channel therebetween for receiving a picture or photograph, both ends of said side members, said top member and said bottom member being mitered, said connecting means being substantially L-shaped and comprising two side portions, each side portion of said connecting means having a resilient engaging element formed within a slot thereof, each said engaging element having a first stud and a laterally spaced second stud immediately adjacent said first stud formed thereon at a level above a surface of said engaging element and said side portions for respectively engaging with said first slot and said second slot; the dimension and the shape of said first channel and said connecting means being such that each said side portion of said connecting means can slide within said first channel along the length thereof until said first and said second studs respectively engage with said first and said second slots; said first stud and said second stud respectively engaging with said first slot and said second slot when said side members, said top member and said bottom member are assembled to form a picture frame, said first stud being impeded by an edge of the first slot, while the second stud remains constrained in a depressed position by an inner wall of said first flange at a region between said first slot and said second slot when changing or installing said picture or photograph, thus allowing limited disengagement of said side members, said top member and said bottom member.

* * * * *